(12) United States Patent
Kim et al.

(10) Patent No.: US 12,278,053 B2
(45) Date of Patent: *Apr. 15, 2025

(54) CERAMIC ELECTRONIC COMPONENT

(71) Applicant: SAMSUNG ELECTRO-MECHANICS CO., LTD., Suwon-si (KR)

(72) Inventors: Jin Woo Kim, Suwon-si (KR); Chang Hak Choi, Suwon-si (KR); Seok Hyun Yoon, Suwon-si (KR); Ki Yong Lee, Suwon-si (KR); Jong Myeong Jeon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/531,057

(22) Filed: Dec. 6, 2023

(65) Prior Publication Data

US 2024/0128022 A1   Apr. 18, 2024

Related U.S. Application Data

(63) Continuation of application No. 17/740,769, filed on May 10, 2022, now Pat. No. 11,887,786.

(30) Foreign Application Priority Data

Jun. 14, 2021  (KR) .......... 10-2021-0076761

(51) Int. Cl.
*H01G 4/12* (2006.01)
*H01G 4/232* (2006.01)
(Continued)

(52) U.S. Cl.
CPC .......... *H01G 4/1227* (2013.01); *H01G 4/232* (2013.01); *H01G 4/248* (2013.01); *H01G 4/30* (2013.01)

(58) Field of Classification Search
CPC .......... H01G 4/232; H01G 4/248; H01G 4/30; H01G 4/012; H01G 4/1227; H01G 4/2325; H01G 4/1209; H01G 4/228; H01G 4/306
See application file for complete search history.

(56) References Cited

U.S. PATENT DOCUMENTS 11,887,786 B2 * 1/2024 Kim .............. H01G 4/232
2015/0187497 A1 * 7/2015 Saito ............. H01G 4/1227
361/301.4

(Continued)

FOREIGN PATENT DOCUMENTS

JP   2012028683 A  *  2/2012
KR  10-2019-0051156 A   5/2019
KR  10-2019-0121149 A   10/2019

OTHER PUBLICATIONS

U.S. Notice of Allowance dated Sep. 6, 2023 issued in U.S. Appl. No. 17/740,769.

*Primary Examiner* — Michael P McFadden
(74) *Attorney, Agent, or Firm* — Morgan, Lewis & Bockius LLP

(57) ABSTRACT

A ceramic electronic component includes a body including a dielectric layer and an internal electrode; and an external electrode disposed on the body and connected to the internal electrode. The dielectric layer includes a plurality of grains and grain boundaries disposed between adjacent grains. The grain boundary includes a secondary phase including Sn, a rare-earth element, and a first subcomponent. The rare-earth element includes at least one of Y, Dy, Ho, Er, Gd, Ce, Nd, (Continued)

Sm, Tb, Tm, La, Gd and Yb. The first subcomponent includes at least one of Si, Mg, and Al.

16 Claims, 6 Drawing Sheets

(51) Int. Cl.
 *H01G 4/248* (2006.01)
 *H01G 4/30* (2006.01)

(56) References Cited

U.S. PATENT DOCUMENTS

| | | | |
|---|---|---|---|
| 2018/0130601 A1* | 5/2018 | Kim | C04B 35/6281 |
| 2018/0182557 A1* | 6/2018 | Park | H01L 28/40 |
| 2019/0051460 A1* | 2/2019 | Kawamura | H01G 4/0085 |
| 2019/0135701 A1 | 5/2019 | Yun et al. | |
| 2020/0051748 A1* | 2/2020 | Park | H01G 4/1227 |
| 2020/0058444 A1* | 2/2020 | Cha | H01G 4/12 |
| 2020/0126727 A1* | 4/2020 | Woo | H01G 4/1227 |
| 2021/0090812 A1* | 3/2021 | Woo | H01G 4/008 |
| 2021/0383973 A1* | 12/2021 | Matsumoto | H01G 4/1227 |

\* cited by examiner

CERAMIC ELECTRONIC COMPONENT

CROSS-REFERENCE TO RELATED APPLICATION(S)

This application is a Continuation Patent Application of U.S. patent application Ser. No. 17/740,769, filed on May 10, 2022, which claims benefit of priority to Korean Patent Application No. 10-2021-0076761 filed on Jun. 14, 2021, the disclosures of which are incorporated herein by reference in their entireties.

TECHNICAL FIELD

The present disclosure relates to a ceramic electronic component.

BACKGROUND

A multilayer ceramic capacitor (MLCC), a ceramic electronic component, may be a chip-type condenser mounted on various electronic products such as an imaging device like a liquid crystal display (LCD) or a plasma display panel (PDP), a computer, a smartphone, and a mobile phone, and may charge or discharge electricity.

Such a multilayer ceramic capacitor may be used as a component of various electronic devices, since a multilayer ceramic capacitor may have a small size, may guarantee high capacity, and may be easily mounted. Recently, as various electronic devices such as computers and mobile devices have been miniaturized and have high output, demand for miniaturization and high capacity of a multilayer ceramic capacitor has also increased.

To obtain miniaturization and high capacity of a multilayer ceramic capacitor, it may be necessary to increase the number of laminated layers by decreasing thicknesses of a dielectric layer and an internal electrode. A thickness of a dielectric layer has reached the level of about 0.6 μm, and the reduction of the thickness has been continued. However, as the thickness of a dielectric layer decreases, an electric field applied to a dielectric at the same operating voltage may increase, and thus, it may be essential to secure reliability of a dielectric.

SUMMARY

An aspect of the present disclosure is to provide a ceramic electronic component having improved reliability.

Another aspect of the present disclosure is to reduce a thickness of a dielectric layer without lowering a dielectric constant.

According to an aspect of the present disclosure, a ceramic electronic component includes a body including a dielectric layer and an internal electrode; and an external electrode disposed on the body and connected to the internal electrode. The dielectric layer includes a plurality of grains and grain boundaries disposed between adjacent grains. The grain boundary includes a secondary phase including Sn, a rare-earth element, and a first subcomponent. The rare-earth element includes at least one of Y, Dy, Ho, Er, Gd, Ce, Nd, Sm, Tb, Tm, La, Gd and Yb. The first subcomponent includes at least one of Si, Mg, and Al.

According to another aspect of the present disclosure, a ceramic electronic component includes a body including a dielectric layer and an internal electrode; and an external electrode disposed on the body and connected to the internal electrode. The dielectric layer includes a plurality of grains and grain boundaries disposed between adjacent grains. The plurality of grains include at least one first grain. The first grain has a core-shell structure including a core and a shell surrounding the core, and the shell of the first grain includes a first region surrounding the core and a second region surrounding the first region. An average Sn content of the grain boundary is defined as Cg, Sn average contents of the core, the first region, and the second region of the first grain are defined as C1, C2 and C3, respectively, and C2, Cg, C3, and C1 satisfy $C2>Cg>C3>C1$, and satisfy one or more of $Cg \geq 1.1*C3$, $Cg \geq 2.0*C1$ and $C2 \geq 1.3*Cg$.

According to another aspect of the present disclosure, a ceramic electronic component includes a body including a dielectric layer and an internal electrode; and an external electrode disposed on the body and connected to the internal electrode. The dielectric layer includes a plurality of grains and a grain boundary disposed between adjacent grains. The plurality of grains include first grains, second grains, and third grains. The first grains, the second grains, and the third grains are different from each other. Each of the first grains has a core-shell structure including a core and a shell surrounding the core, and the shell of the first grain includes a first region surrounding the core and a second region surrounding the first region, and Sn average contents of the core, the first region, and the second region of the first grain are different from each other. Each of the second grains has a core-shell structure including a core and a shell surrounding the core, and Sn average contents of the core and the shell of the second grain are different from each other. Each the third grains includes Sn more uniformly distributed than the first grains and the second grains. The number of the first grains is 5% or more and 50% or less of the total number of the plurality of grains.

BRIEF DESCRIPTION OF DRAWINGS

The above and other aspects, features, and advantages of the present disclosure will be more clearly understood from the following detailed description, taken in conjunction with the accompanying lead-outs, in which.

DETAILED DESCRIPTION

Figure 1:
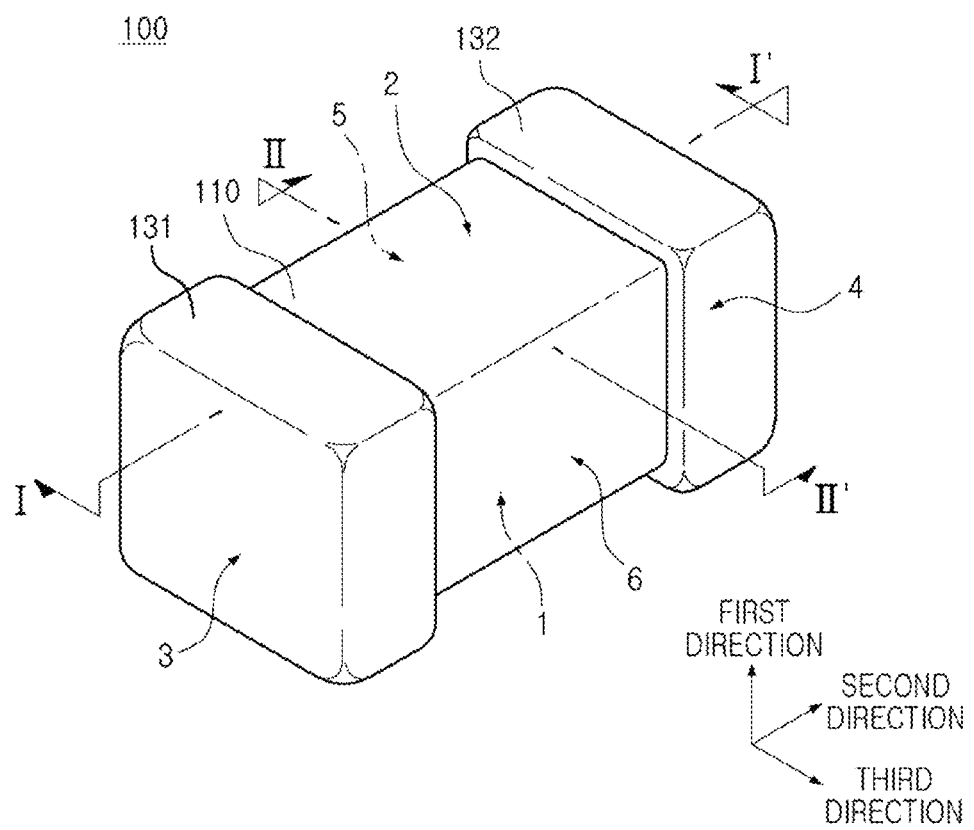
FIG. 1 is a perspective diagram illustrating a ceramic electronic component according to an example embodiment of the present disclosure.

In the description below, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clarity of description, and elements indicated by the same reference numeral are the same elements in the drawings.

In the drawings, same elements will be indicated by same reference numerals. Also, redundant descriptions and detailed descriptions of known functions and elements that may unnecessarily make the gist of the present invention obscure will be omitted. In the accompanying drawings, some elements may be exaggerated, omitted or briefly illustrated, and the sizes of the elements do not necessarily reflect the actual sizes of these elements. The terms, "include," "comprise," "is configured to," etc. of the description are used to indicate the presence of features, numbers, steps, operations, elements, parts or combination thereof, and do not exclude the possibilities of combination or addition of one or more features, numbers, steps, operations, elements, parts or combination thereof.

In the drawings, the first direction may be defined as a lamination direction or a thickness (T) direction, the second direction may be defined as a length (L) direction, and the third direction may be defined as a width (W) direction.

Ceramic Electronic Component

FIG. 1 is a perspective diagram illustrating a ceramic electronic component according to an example embodiment.

Figure 2:
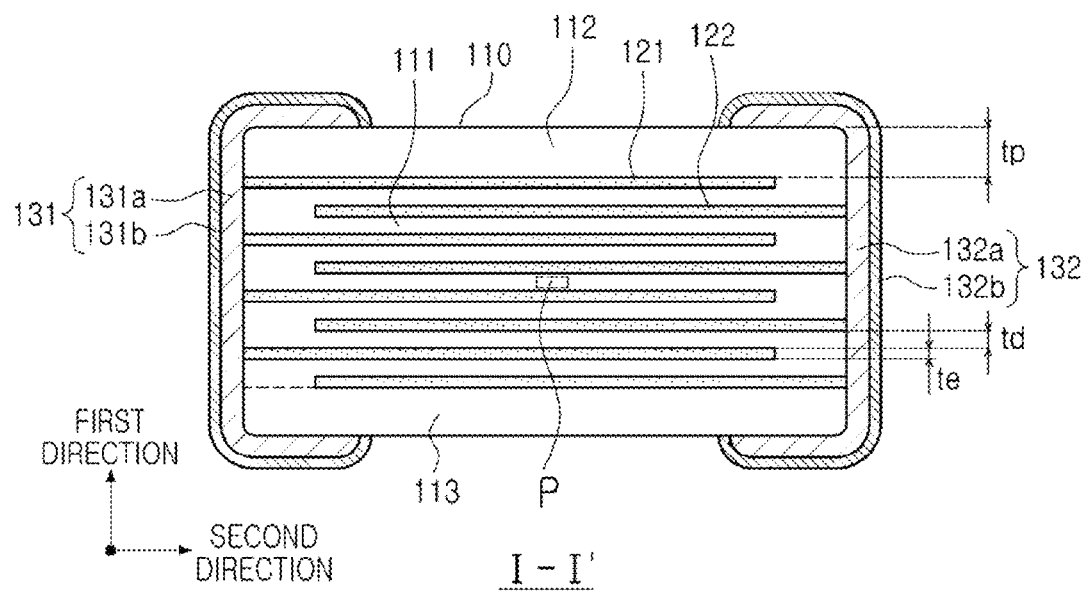
FIG. 2 is a cross-sectional diagram illustrating a ceramic electronic component in FIG. 1 taken along line I-I'.

FIG. 2 is a cross-sectional diagram illustrating a ceramic electronic component in FIG. 1 taken along line I-I'.

Figure 3:
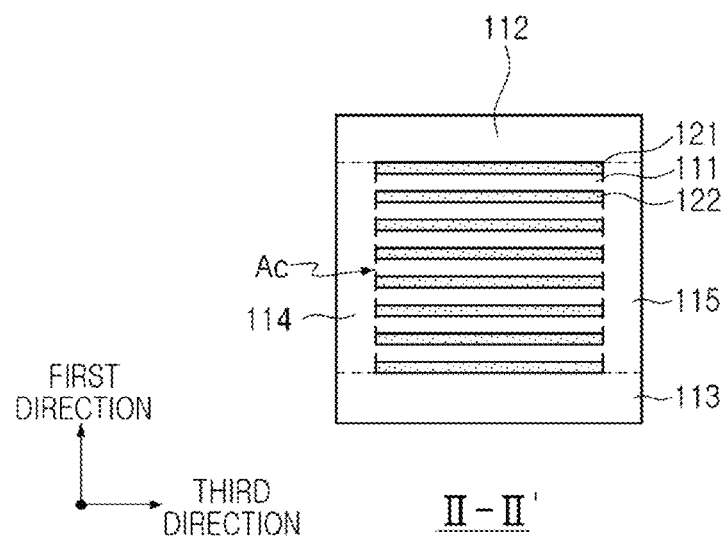
FIG. 3 is a cross-sectional diagram illustrating a ceramic electronic component in FIG. 1 taken along line II-II'.

FIG. 3 is a cross-sectional diagram illustrating a ceramic electronic component in FIG. 1 taken along line II-II'.

Figure 4:
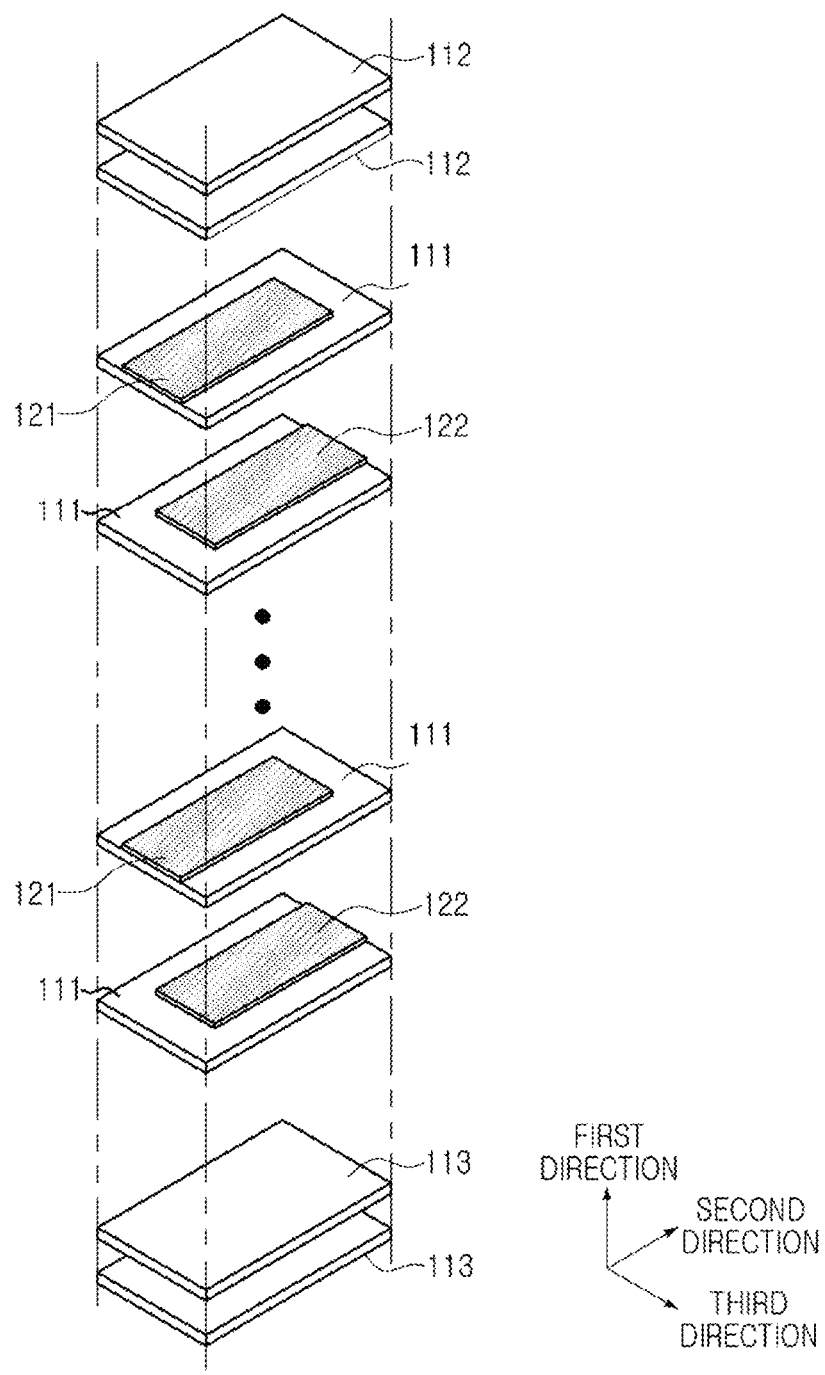
FIG. 4 is an exploded perspective diagram illustrating a body of a ceramic electronic component according to an example embodiment of the present disclosure.

FIG. 4 is an exploded perspective diagram illustrating a body of a ceramic electronic component according to an example embodiment.

Figure 5:
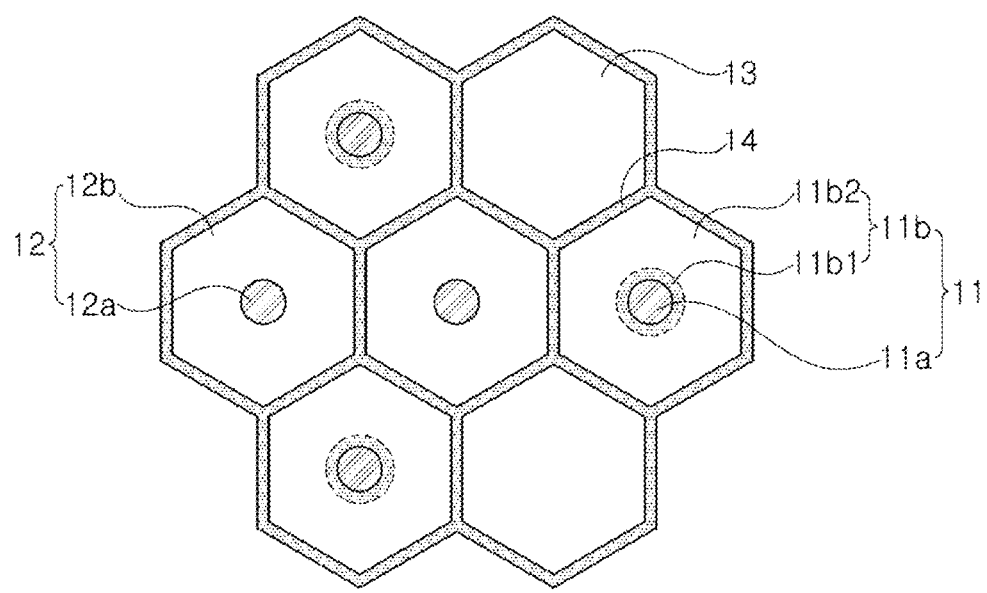
FIG. 5 is an enlarged diagram illustrating region P in FIG. 2, illustrating a grain structure of a dielectric layer according to an example embodiment of the present disclosure.
Figure 6:
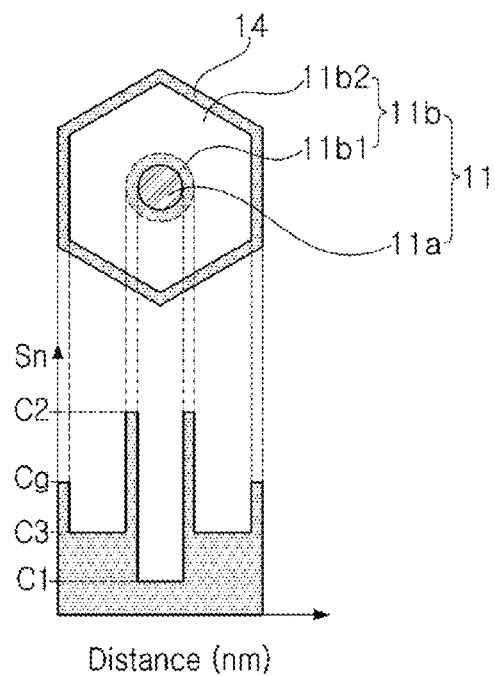
FIG. 6 is a graph illustrating distribution of concentration of Sn in a first grain.
Figure 7:
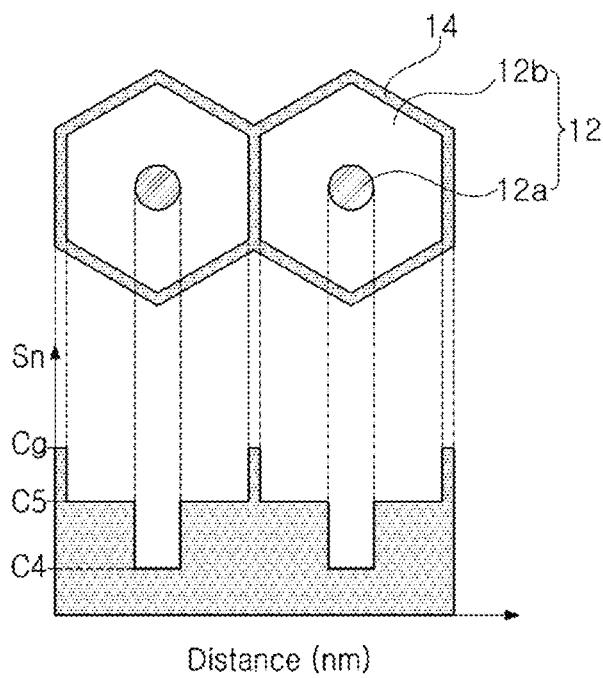
FIG. 7 is a graph illustrating distribution of concentration of Sn in a second grain.

FIG. 5 is an enlarged diagram illustrating region P in FIG. 2, illustrating a grain structure of a dielectric layer according to an example embodiment.

Hereinafter, a ceramic electronic component 100 will be described in greater detail with reference to FIGS. 1 to 5 according to an example embodiment. Also, a multilayer ceramic capacitor (hereinafter, referred to as "MLCC") will be described as an example of a ceramic electronic component, but an example embodiment thereof is not limited thereto, and the example embodiment may be applied to various ceramic electronic components using a ceramic material, such as, for example, an inductor, a piezoelectric element, a varistor, or a thermistor.

The ceramic electronic component 100 in an example embodiment may include a body 110 including a dielectric layer 111 and internal electrodes 121 and 122, and external electrodes 131 and 132 disposed on the body and connected to the internal electrodes. The dielectric layer 111 may include a plurality of grains 11, 12, 13 and a grain boundary 14 disposed between adjacent grains, and the grain boundary 14 may include Sn, a rare-earth element and a secondary phase including a first subcomponent. A rare-earth element may include one or more of Y, Dy, Ho, Er, Gd, Ce, Nd, Sm, Tb, Tm, La, Gd and Yb, and a first subcomponent may include one or more of Si, Mg and Al.

The body 110 may include the dielectric layer 111 and internal electrodes 121 and 122 alternately laminated.

The shape of the body 110 may not be limited to any particular shape, but as illustrated, the body 110 may have a hexahedral shape or a shape similar to a hexahedral shape. Due to reduction of ceramic powder included in the body 110 during a baking process, the body 110 may not have an exact hexahedral shape formed with entirely linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

The plurality of dielectric layers 111 forming the body 110 may be in a baked state, and a boundary between the adjacent dielectric layers 111 may be integrated with each other such that the boundary may not be distinct without using a scanning electron microscope (SEM).

The dielectric layer 111 may include a plurality of grains 11, 12, and 13 and a grain boundary 14 disposed between adjacent grains, and the grain boundary 14 may include a secondary phase including Sn, a rare-earth element, and a first subcomponent. A rare-earth element may include one or more of Y, Dy, Ho, Er, Gd, Ce, Nd, Sm, Tb, Tm, La, Gd and Yb, and a first subcomponent may include one or more of Si, Mg and Al.

A multilayer ceramic capacitor (MLCC), one of ceramic electronic components, has been designed to have high capacity and a layer with a reduced thickness. To reduce the thickness of the dielectric layer, atomization of a base material may be essential. However, it may be difficult to control grain growth simply by atomizing the base material, the thickness of the dielectric layer may be locally reduced, and the number of grain boundaries may decrease such that grain boundary resistance may be lowered, which may work as a main cause of breaking down voltage (BDV) and reliability deterioration.

As a method for strengthening grain boundary resistance, the amount of a first subcomponent such as Si, Mg, Al, etc. may increase, but when the amount of the first subcomponent is excessive, side effects such as an increase in the baking temperature may occur. Thus, it may be necessary to reduce the amount of the first subcomponent element and to strengthen the grain boundary resistance.

In an example embodiment, by including the secondary phase including Sn, a rare-earth element, and a first subcomponent in the grain boundary, the increase in a first subcomponent may be reduced and the grain boundary resistance may be enhanced. Generally, the grain boundary 14 may include a rare-earth element and a first subcomponent, and when Sn is not included in the grain boundary 14, the effect of improving the grain boundary resistance may be insufficient, and to secure a sufficient effect of improving the grain boundary resistance, the content of a first subcomponent may be excessive. When Sn is included in the grain boundary, Sn may form a secondary phase with a rare-earth element and a first subcomponent, such that the grain boundary resistance may effectively improve. Accordingly, the dielectric layer may have a reduced thickness, and high reliability may be implemented therein.

The content of each of Sn, a rare-earth element and a first subcomponent included in the secondary phase may not be limited to any particular content. For example, when an atomic ratio of Sn, a rare-earth element and a first subcomponent included in the secondary phase is Sn:rare-earth element:first subcomponent=1:x:y, x may be 0.01 to 10.0, and y may be 0.01 to 10.0.

In this case, atomic weights of Sn, a rare-earth element, and a first subcomponent included in the grain boundary 14 may have a length of 5 nm in a direction perpendicular to the grain boundary, and may be measured by line-profiling a line of which a center thereof matches a center of the grain boundary using an STEM-EDS.

In an example embodiment, a rare-earth element may be Dy, and a first subcomponent may be Si. Accordingly, the grain boundary may include a Sn—Dy—Si secondary phase.

In an example embodiment, the plurality of grains may include at least one first grain 11, and the first grain 11 may have a core-shell structure including a core 11a and a shell 11b surrounding the core 11a, and the shell 11b of the first grain may include a first region 11b1 surrounding the core 11a and a second region 11b2 surrounding the first region 11b1.

Referring to FIG. 5, an Sn average content of the grain boundary 14 is defined as Cg, and Sn average contents of the core 11a, the first region 11b1, and the second region 11b2 of the first grain 11 are defined as C1, C2, and C3, respectively, Cg, C1, C2, and C3 may satisfy C2>Cg>C3>C1.

In other words, the Sn content may have the lowest value in the core 11a, and may have the highest value in the first region 11b1 surrounding the core 11a, and may have a concentration gradient in which the Sn content may decrease in the second region 11b2 and may increase toward the grain boundary 14.

As the Sn concentration gradient is satisfied, grain growth may be inhibited, and a secondary phase including Sn, a rare-earth element, and a first subcomponent may be easily formed on the grain boundary, thereby effectively improving the grain boundary resistance.

In an example embodiment, Cg, C1, C2, and C3 may satisfy one or more of Cg≥1.1*C3, Cg≥2.0*C1, and C2≥1.3*Cg. In other words, Cg, C1, C2, and C3 may satisfy one or two of Cg≥1.1*C3, Cg≥2.0*C1 and C2≥1.3*Cg, or may satisfy all Cg≥1.1*C3, Cg≥2.0*C1 and C2≥1.3*Cg.

When the average Sn content Cg of the grain boundary is 1.1 times or more of the Sn average content C3 of the second region, the withstand voltage properties may improve.

When the average Sn content Cg of the grain boundary is 2.0 times or more of the Sn average content C1 of the core, grain overgrowth may be inhibited.

When the average Sn content C2 of the first region is 1.3 times or more of the average Sn content Cg of the grain boundary, high-temperature reliability may improve.

The concentration gradient of a rare-earth element may also have the same shape as that of the concentration gradient of Sn.

In other words, when the average rare-earth element content of the grain boundary 14 is defined as Cg', and the average rare-earth element contents of the core 11a, the first region 11b1, and the second region 11b2 of the first grain 11 is defined as C1', C2' and C3', respectively, C2', Cg', C3', and C1' may satisfy C2'>Cg'>C3'>C1'.

Also, Cg', C1', C2', and C3' may satisfy one or more of Cg'≥1.1*C3', Cg'≥2.0*C1', and C2'≥1.3*Cg'. In other words, Cg', C1', C2', and C3' may satisfy one or two of Cg'≥1.1*C3', Cg'≥2.0*C1' and C2'≥1.3*Cg', or satisfy all Cg'≥1.1*C3', Cg'≥2.0*C1' and C2'≥1.3*Cg'.

In an example embodiment, the number of the first grain 11 may be 5% or more and 50% or less of the total number of the plurality of grains.

When the number ratio of the first grain 13 is less than 5%, it may be difficult to include the secondary phase including Sn, a rare-earth element, and a first subcomponent in the grain boundary, and accordingly, sufficient grain boundary resistance may not be secured.

When the number ratio of the first grain 11 is greater than 50% of the total number of the plurality of grains, grain growth may be excessively inhibited such that a dielectric constant may be lowered, and it may be difficult to secure a dielectric constant of 2600 or more.

The method of controlling the number ratio of the first grain 11 may not be limited to any particular method. For example, when a dielectric composition including a $BaTiO_3$ dielectric powder having a core-shell structure, a Sn content of 0.5 to 2.0 mol % in the shell, and a size of 70 nm or less is used, the number ratio of the first grain 11 may be easily controlled to be 5-50% of the total number of the plurality of grains. When a dielectric composition in which $BaTiO_3$ dielectric powder has a size of greater than 70 nm and the Sn content included in the shell is greater than 2.0 mol % is used, the ratio of the first grain may increase excessively.

In an example embodiment, the plurality of grains may include at least one second grain 12, and the second grains 12 has a core-shell structure including a core 12a and a shell 12b surrounding the core. When average Sn contents of the core and the shell of the second grain are defined as C4 and C5, respectively, Cg, C5, and C4 may satisfy Cg>C5>C4.

Also, Cg, C4, and C5 may satisfy Cg≥1.1*C5 and Cg≥2.0*C4.

Differently from the first grain 11, the shell 12b of the second grains 12 may not include the first region having an Sn content higher than that of the grain boundary. The Sn content of the shell 12b of the second grains 12 may have a Sn content similar to that of the second region 11b2 of the shell of the first grain, and the Sn content ratio with the core or grain boundary may also be similar to that of the second region 11b2 of the shell of the first grain.

Also, the plurality of grains may include at least one third grain 13, and Sn may be uniformly distributed in the third grain 13.

In an example embodiment, the plurality of grains may include $BaTiO_3$ as a main component.

Also, in addition to the above-described Sn, rare-earth element and first subcomponent, at least one of Mn, V, Cr, Fe, Ni, Co, Cu and Zn may be included as a subcomponent, and at least one of Zr, Al, Mg and Ca may be included as a subcomponent.

The additional subcomponent may be added to base material powder or may be coated on the base material powder.

The thickness td of the dielectric layer 111 may not be limited to any particular size.

Generally, when the dielectric layer has a thickness of less than 0.6 μm, in particular, when the thickness of the dielectric layer is 0.4 μm or less, reliability may degrade.

As described above, in an example embodiment, by including the secondary phase including Sn, a rare-earth element, and a first subcomponent to the grain boundary 14, grain boundary resistance may increase such that reliability may improve. Thus, even when the thickness is 0.4 μm or less, excellent reliability may be secured.

Therefore, the reliability improvement effect according to the reinforcement of the grain boundary resistance in the example embodiment may be prominent when the thickness of the dielectric layer 111 is 0.4 μm or less.

The thickness td of the dielectric layer 111 may refer to an average thickness of the dielectric layer 111 disposed between the first and second internal electrodes 121 and 122.

The average thickness of the dielectric layer 111 may be measured by scanning a cross-sectional surface of the body 110 in the length and thickness direction (L-T).

For example, the thicknesses of 30 points with an equivalent interval in the length direction of a dielectric layer from an image obtained by scanning a cross-sectional surface taken in the first and second directions (length and thickness direction) of a central portion of the body 110 in the third direction (width direction) may be measured, and an average thereof may be measured.

The thickness measured at the 30 points with an equivalent interval may be measured in a capacitor forming portion Ac, a region in which the first and second internal electrodes 121 and 122 overlap each other.

The body 110 may include a capacitor forming portion Ac disposed in the body 110 and forming capacitance including a first internal electrode 121 and a second internal electrode 122 disposed to oppose each other with a dielectric layer 111 interposed therebetween, and cover portions 112 and 113 formed above and below the capacitor forming portion Ac in the first direction.

Also, the capacitor forming portion Ac may contribute to capacitance formation of the capacitor, and may be formed by repeatedly laminating the plurality of first and second internal electrodes 121 and 122 with a dielectric layer 111 interposed therebetween.

The cover portions 112 and 113 may include an upper cover portion 112 disposed above the capacitance forming portion Ac in the first direction and a lower cover portion disposed below the capacitor forming portion Ac in the first direction.

The upper cover portion 112 and the lower cover portion 113 may be formed by laminating a single dielectric layer or two or more dielectric layers on upper and lower surfaces of the capacitor forming portion Ac in the thickness direction, respectively, and may prevent damage to the internal electrode caused by physical or chemical stress.

The upper cover portion 112 and the lower cover portion 113 may not include an internal electrode, and may include the same material as that of the dielectric layer 111.

In other words, the upper cover portion 112 and the lower cover portion 113 may include a ceramic material, and may include, for example, a barium titanate ($BaTiO_3$) ceramic material.

The thicknesses of the cover portion 112 and 113 may not be limited to any particular size. However, to easily obtain miniaturization and high capacity of the ceramic electronic component, the thickness tp of the cover portions 112 and 113 may be 20 μm or less.

Also, margin portions 114 and 115 may be disposed on a side surface of the capacitance forming portion Ac.

The margin portions 114 and 115 may include a margin portion 114 disposed on the fifth surface 5 of the body 110 and a margin portion 115 disposed on the sixth surface 6 of the body 110. In other words, the margin portions 114 and 115 may be disposed on both side surfaces of the ceramic body 110 in the width direction.

As illustrated in FIG. 3, the margin portions 114 and 115 may refer to a region between both ends of the first and second internal electrodes 121 and 122 and a boundary surface of the body 110 on a cross-sectional surface of the body 110 taken in a width-thickness (W-T) direction.

The margins 114 and 115 may prevent damage to the internal electrodes caused by physical or chemical stress.

The margin portions 114 and 115 may be formed by forming internal electrodes by applying a conductive paste to the ceramic green sheet other than the region in which the margin portion is to be formed.

Also, to inhibit a step difference formed by the internal electrodes 121 and 122, the internal electrodes may be cut to be exposed to the fifth and sixth surfaces 5 and 6 of the body after lamination, and a single dielectric layer or two or more dielectric layers may be laminated on both side surfaces of the capacitor forming portion Ac, thereby forming the margin portions 114 and 115.

The internal electrodes 121 and 122 may be alternately laminated with the dielectric layer 111.

The internal electrodes 121 and 122 may include first and second internal electrodes 121 and 122. The first and second internal electrodes 121 and 122 may be alternately disposed to oppose each other with the dielectric layer 111 included in the body 110 interposed therebetween, and may be exposed to the third and fourth surfaces 3 and 4 of the body 110, respectively.

Referring to FIG. 2, the first internal electrode 121 may be spaced apart from the fourth surface 4 and may be exposed through (or extend from or be in contact with) the third surface 3, and the second internal electrode 122 may be spaced apart from the third surface 3 and may be exposed through (or extend from or be in contact with) the fourth surface 4.

In this case, the first and second internal electrodes 121 and 122 may be electrically separated from each other by the dielectric layer 111 disposed therebetween.

Referring to FIG. 4, the body 110 may be formed by alternately laminating a ceramic green sheet on which the first internal electrode 121 is printed and a ceramic green sheet on which the second internal electrode 122 is printed, and baking the green sheets.

The internal electrodes 121 and 122 may include Ni. However, the material for forming the internal electrodes 121 and 122 is not limited to any particular material, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), or alloys thereof.

Also, the internal electrodes 121 and 122 may be formed by printing a conductive paste for internal electrode including one or more of nickel (Ni), copper (Cu), palladium (Pd), silver (Ag), gold (Au), platinum (Pt), tin (Sn), tungsten (W), titanium (Ti), or alloys thereof. As the method for printing the conductive paste for internal electrodes, a screen-printing method or a gravure printing method may be used, but an example embodiment thereof is not limited thereto.

The thickness to of the internal electrodes 121 and 122 may not limited to any particular size.

However, generally, when the internal electrode has a thickness of less than 0.6 μm, in particular, when the thickness of the internal electrode is 0.4 μm or less, reliability may degrade.

As described above, in an example embodiment, by including the secondary phase including Sn, a rare-earth element, and a first subcomponent in the grain boundary 14, grain boundary resistance may increase such that reliability may improve, and thus, even when the internal electrode 121 and 122 has a thickness of 0.4 μm or less, excellent reliability may be secured.

Therefore, the reliability improvement effect according to the reinforcement of the grain boundary resistance in the example embodiment may be prominent when the thickness of the dielectric layer 111 is 0.4 μm or less, and miniaturization and high capacity of the ceramic electronic component may be easily implemented.

The thickness to of the internal electrodes 121 and 122 may refer to an average thickness of the internal electrodes 121 and 122.

The average thickness of the internal electrodes 121 and 122 may be measured by scanning a cross-sectional surface of the body 110 in the length and thickness direction (L-T).

For example, the thicknesses of 30 points with an equivalent interval in the length direction of the first and second internal electrodes 121 and 122 from an image obtained by scanning a cross-sectional surface taken in the first and second directions (length and thickness direction) of a central portion of the body 110 in the third direction (width direction) may be measured, and an average thereof may be measured.

The 30 points with an equivalent interval may be measured in the capacitor forming portion Ac, a region in which the first and second internal electrodes 121 and 122 overlap each other.

The external electrodes 131 and 132 may be disposed on the third surface 3 and the fourth surface 4 of the body 110.

The external electrodes 131 and 132 may be disposed on the third and fourth surfaces 3 and 4 of the body 110, respectively, and may include first and second external electrodes 131 and 132 connected to the first and second internal electrodes 121 and 122, respectively.

Referring to FIG. 1, the external electrodes 131 and 132 may be disposed to cover both end surfaces of side margin portions 114 and 115 in the second direction.

In the example embodiment, the ceramic electronic component 100 may have two external electrodes 131 and 132, but the number and shape of the external electrodes 131 and 132 may be varied depending on the form of the internal electrodes 121 and 122 or for other purposes.

The external electrodes 131 and 132 may be formed using any material having electrical conductivity, such as metal, and a specific material may be determined in consideration of electrical properties, structural stability, or the like, and may have a multilayer structure.

For example, the external electrodes 131 and 132 may include electrode layers 131a and 132a disposed on the body 110 and plating layers 131b and 132b formed on the electrode layers 131a and 132a.

For example, the electrode layers 131a and 132a may be a baked electrode including a conductive metal and glass, or a resin-based electrode including a conductive metal and a resin.

Also, the electrode layers 131a and 132a may have a shape in which a baked electrode and a resin-based electrode are sequentially formed on a body. Also, the electrode layers 131a and 132a may be formed by transferring a sheet including a conductive metal onto the body or by transferring a sheet including a conductive metal onto the baked electrode.

As the conductive metal included in the electrode layers 131a and 132a, a material having excellent electrical conductivity may be used, and the material is not limited to any particular material. For example, the conductive metal may be one or more of nickel (Ni), copper (Cu), and alloys thereof.

The plating layers 131b and 132b may improve mounting properties. The type of the plating layers 131b and 132b is not limited to any particular type, and may be a plating layer including one or more of Ni, Sn, Pd, and alloys thereof, and may include a plurality of layers.

For example, the plating layers 131b and 132b may be a Ni plating layer or a Sn plating layer, and a Ni plating layer and a Sn plating layer may be formed in order on the electrode layers 131a and 132a, or a Sn plating layer, a Ni plating layer, and a Sn plating layer may be formed in order. Also, the plating layers 131b and 132b may include a plurality of Ni plating layers and/or a plurality of Sn plating layers.

The size of the ceramic electronic component 100 may not limited to any particular size.

However, to obtain miniaturization and high capacity at the same time, the number of laminates may need to be increased by reducing the thickness of the dielectric layer and the internal electrode. Thus, the effect of improving reliability and insulation resistance in the example embodiment may be prominent in the ceramic electronic component 100 having a size of 1005 (length×width, 1.0 mm×0.5 mm) or less.

Accordingly, considering the size of the external electrode, when the length of the ceramic electronic component 100 is 1.1 mm or less and the width is 0.55 mm or less, the reliability improvement effect in the example embodiment may be prominent. The length of the ceramic electronic component 100 may refer to the size of the ceramic electronic component 100 in the second direction, and the width of the ceramic electronic component 100 may refer to the size of the ceramic electronic component 100 in the third direction.

Experimental Example

A dielectric composition was prepared, and an internal electrode pattern was formed by applying a conductive paste for internal electrodes including Ni on a ceramic green sheet including the dielectric composition. Thereafter, a laminate obtained by laminating the ceramic green sheets having the internal electrode pattern formed thereon was cut in chip units and was baked to prepare a prototype multilayer ceramic capacitor (prototype MLCC).

In the invention example, a dielectric composition including a dielectric powder having a core-shell structure having a shell including 2 moles of Sn relative to 100 moles of $BaTiO_3$ and a core of $BaTiO_3$, and having an average size of 70 nm was used.

In the comparative example, a dielectric composition including no Sn and including $BaTiO_3$ powder was used.

Figure 8:
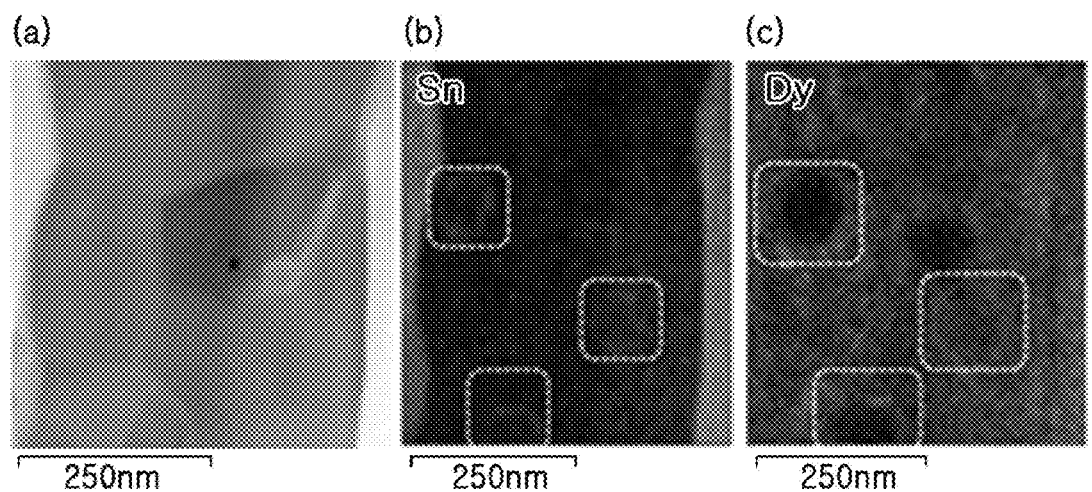
FIG. 8 shows image (a) obtained by scanning a cross-sectional surface of a dielectric layer using an STEM, image (b) obtained by mapping an Sn element using an STEM-EDS, and image (c) obtained by mapping an Dy element using an STEM-EDS in relation to the inventive example.
Figure 9:
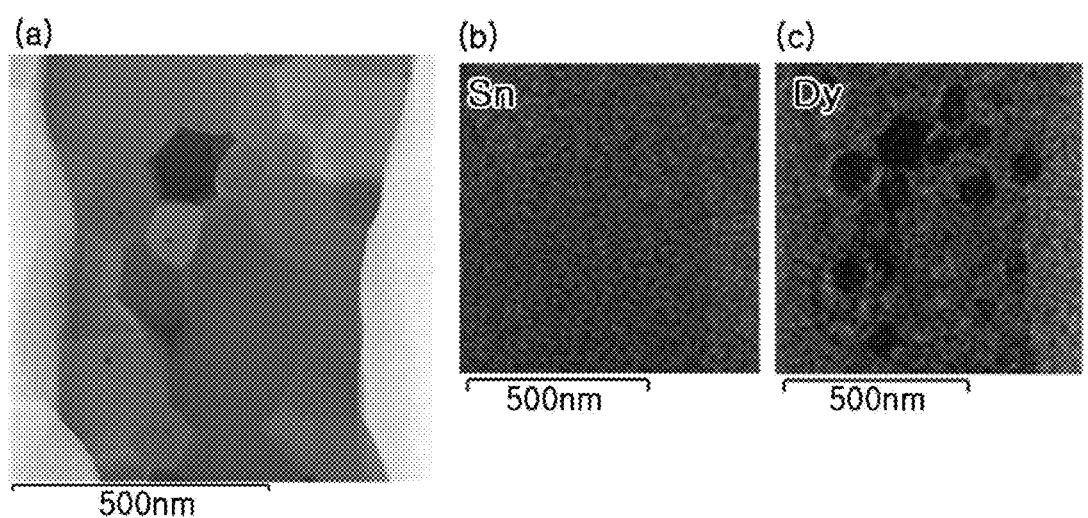
FIG. 9 shows image (a) obtained by scanning a cross-sectional surface of a dielectric layer using an STEM, image (b) obtained by mapping an Sn element using an STEM- EDS, and image (c) obtained by mapping an Dy element using an STEM-EDS in relation to the comparative example.

The prototype multilayer ceramic capacitor (prototype MLCC) was cut in the first and second directions in the center in the third direction, images were obtained by scanning the center in the first and second directions using STEM. FIG. 8 shows image (a) obtained by scanning a cross-sectional surface of a dielectric layer using an STEM, image (b) obtained by mapping an Sn element using an STEM-EDS, and image (c) obtained by mapping an Dy element using an STEM-EDS in relation to the inventive example. FIG. 9 shows image (a) obtained by scanning a cross-sectional surface of a dielectric layer using an STEM, image (b) obtained by mapping an Sn element using an STEM-EDS, and image (c) obtained by mapping an Dy element using an STEM-EDS in relation to the comparative example Referring to FIG. 8, Sn and Dy were present in the grain boundary in the region indicated by a square. Also, Si was also present in the grain boundary. Therefore, the Sn—Dy—Si secondary phase was present in the grain boundary.

In FIG. 9, Dy was present in the grain boundary, but Sn was not present.

Reliability of the invention example and comparative example was tested by a high-temperature accelerated lifespan test.

In the high temperature accelerated lifespan test, 100 sample chips were prepared for each of the invention examples and comparative examples, a voltage of 9.45V was applied at 105° C. for 12 hours, and a sample chip in which insulation resistance was lowered to $\frac{1}{10}$ or less of an initial value was determined as defective.

In the comparative example, 22 samples out of 100 samples were determined as defective. In the invention example, only one sample out of 100 samples was determined as defective, which indicated that reliability significantly improved.

According to the aforementioned example embodiments, by disposing a secondary phase including Sn, a rare-earth element, and a first subcomponent in the dielectric grain boundary, reliability may improve.

Also, by controlling the grain boundary and the Sn distribution included in the grain, reliability may improve.

While the example embodiments have been illustrated and described above, it will be apparent to those skilled in the art that modifications and variations could be made without departing from the scope of the present invention as defined by the appended claims.

What is claimed is:

1. A ceramic electronic component, comprising:
a body including a dielectric layer and an internal electrode; and
an external electrode disposed on the body and connected to the internal electrode,
wherein the dielectric layer includes a plurality of grains and grain boundaries disposed between adjacent grains,
wherein the grain boundary includes Sn, a rare-earth element, and a first subcomponent,
wherein the first subcomponent includes at least one of Si, Mg, and Al.

2. The ceramic electronic component of claim 1, wherein, when an element ratio of Sn, the rare-earth element, and the first subcomponent included in the grain boundary is Sn:rare-earth element:first subcomponent=1:x:y, x is 0.01 to 10.0, and y is 0.01 to 10.0.

3. The ceramic electronic component of claim 1, wherein the rare-earth element includes Dy, and the first subcomponent includes Si.

4. The ceramic electronic component of claim 1,
wherein the plurality of grains include at least one first grain,
wherein the first grain has a core-shell structure including a core and a shell surrounding the core, and the shell of the first grain includes a first region surrounding the core and a second region surrounding the first region, and
wherein an average Sn content of the grain boundary is defined as Cg, Sn average contents of the core, the first region, and the second region of the first grain are defined as C1, C2 and C3, respectively, and C2, Cg, C3, and C1 satisfy C2>Cg>C3>C1.

5. The ceramic electronic component of claim 4, wherein Cg, C1, C2, and C3 satisfy at least one of Cg≥1.1*C3, Cg≥2.0*C1 and C2≥1.3*Cg.

6. The ceramic electronic component of claim 4, wherein an average rare-earth element content of the grain boundary is defined as Cg', average rare-earth element contents of the core, the first region, and the second region of the first grain are defined as C1', C2' and C3', respectively, and C2', Cg', C3', and C1' satisfy C2'>Cg'>C3'>C1'.

7. The ceramic electronic component of claim 6, wherein Cg', C1', C2', C3' satisfy at least one of Cg'≥1.1*C3', Cg'≥2.0*C1' and C2'≥1.3*Cg'.

8. The ceramic electronic component of claim 4,
wherein the plurality of grains include at least one second grain,
wherein the second grain has a core-shell structure including a core and a shell surrounding the core, and
wherein average Sn contents of the core and the shell of the second grain are defined as C4 and C5, respectively, and Cg, C5, and C4 satisfy Cg>C5>C4.

9. The ceramic electronic component of claim 8, wherein Cg, C4, C5 satisfy Cg≥1.1*C5, and Cg≥3.0*C4.

10. The ceramic electronic component of claim 8,
wherein the plurality of grains includes at least one third grain, and
wherein Sn is uniformly distributed in the third grain.

11. The ceramic electronic component of claim 1, wherein the number of the first grains is 5% or more and 50% or less of the total number of the plurality of grains.

12. The ceramic electronic component of claim 1, wherein the plurality of grains include $BaTiO_3$ as a main component.

13. A ceramic electronic component, comprising:
a body including a dielectric layer and an internal electrode; and
an external electrode disposed on the body and connected to the internal electrode,
wherein the dielectric layer includes a plurality of grains and grain boundaries disposed between adjacent grains,
wherein the plurality of grains include at least one first grain,
wherein the first grain has a core-shell structure including a core and a shell surrounding the core, and the shell of the first grain includes a first region surrounding the core and a second region surrounding the first region,
wherein an average rare-earth element content of the grain boundary is defined as Cg', average rare-earth element contents of the core, the first region, and the second region of the first grain are defined as C1', C2' and C3', respectively, and C2', Cg', C3', and C1' satisfy C2'>Cg'>C3'>C1', and satisfy one or more of Cg'≥1.1*C3', Cg'≥2.0*C1' and C2'≥1.3*Cg'.

14. The ceramic electronic component of claim 13,
wherein the grain boundary includes Sn, a rare-earth element, and a first subcomponent.

15. The ceramic electronic component of claim 14,
wherein the first subcomponent includes at least one of Si, Mg, and Al.

16. The ceramic electronic component of claim 14, wherein the grain boundary includes includes Sn—Dy—Si.

* * * * *